United States Patent [19]

Miller

[11] Patent Number: 4,596,109
[45] Date of Patent: Jun. 24, 1986

[54] METHOD FOR CRIMPING A TUBE

[75] Inventor: Lowell A. Miller, Denver, Colo.

[73] Assignee: Scientific Laboratories, Inc., Denver, Colo.

[21] Appl. No.: 716,804

[22] Filed: Mar. 27, 1985

Related U.S. Application Data

[62] Division of Ser. No. 587,949, Mar. 9, 1984, Pat. No. 4,515,550.

[51] Int. Cl.⁴ .................... B29C 57/00; B29D 22/00
[52] U.S. Cl. ...................................... 53/397; 53/477;
53/585; 65/103; 65/110; 264/512; 264/516;
264/519; 264/571; 425/388
[58] Field of Search ............... 264/512, 516, 519, 571;
425/388; 53/397, 477, 585; 65/103, 110

[56] References Cited

U.S. PATENT DOCUMENTS

| | | | |
|---|---|---|---|
| 1,882,925 | 10/1932 | Rock | 53/477 X |
| 2,423,237 | 7/1947 | Haslacher | 264/519 X |
| 3,350,186 | 10/1967 | Meinhard | 65/110 X |
| 3,894,902 | 7/1975 | Hough et al. | 264/512 X |
| 3,998,919 | 12/1976 | Urquhart | 264/322 X |
| 4,032,281 | 6/1977 | Rakovsky | 425/392 |
| 4,097,570 | 6/1978 | Dickson et al. | 425/392 X |
| 4,215,087 | 7/1980 | Mathison | 264/320 |

FOREIGN PATENT DOCUMENTS 56-80427  7/1981  Japan .................... 264/512

Primary Examiner—Jan Silbaugh
Attorney, Agent, or Firm—John H. Widdowson

[57] ABSTRACT

An apparatus for forming a tube including a base, a pair of legs secured to the ends of the base, and a holder base attached to the base. A tube holder for holding the tube is connected to the holder base. The tube holder has a structure defining a pair of diametrically opposed openings. A pair of soldering irons is oppositely secured with respect to each other in proximity to the top of the pair of legs. Each soldering iron has a hot end that generally registers with one of the opposed openings such as to be in close proximity to the tube being held by the tube holder in order to soften the material of the tube in the area contiguous to the openings. Power is conducted and supplied to each of the soldering irons. Vacuum is drawn on top of the tube to suck or pull inward the tube in the spots being softened from the heat of the pair of soldering irons. A brass conduit is positioned in the tube in order to cool the material of the tube in spots being softened and simultaneously therewith for ceasing the inward movement of the softened spots. A process for crimping a tube to retain an antibody or antigen coated ball, or the like, therein, comprising the steps of positioning the tube containing the coated ball, or the like, in a tube holder having a pair of opposed openings. The ends of the pair of soldering irons are registered with the opposed opening and in close proximity to the top of the tube. The process additionally includes the steps of heating with the pair of soldering irons the sides of the tube in the area facing the pair of opposed openings of the tube holder in order to soften the area; drawing a vacuum on the tube in order to pull inward the area of the tube being softened from the heat of the pair of soldering irons; and ceasing the inward movement of the pair of softened spots to crimp the tube.

5 Claims, 12 Drawing Figures

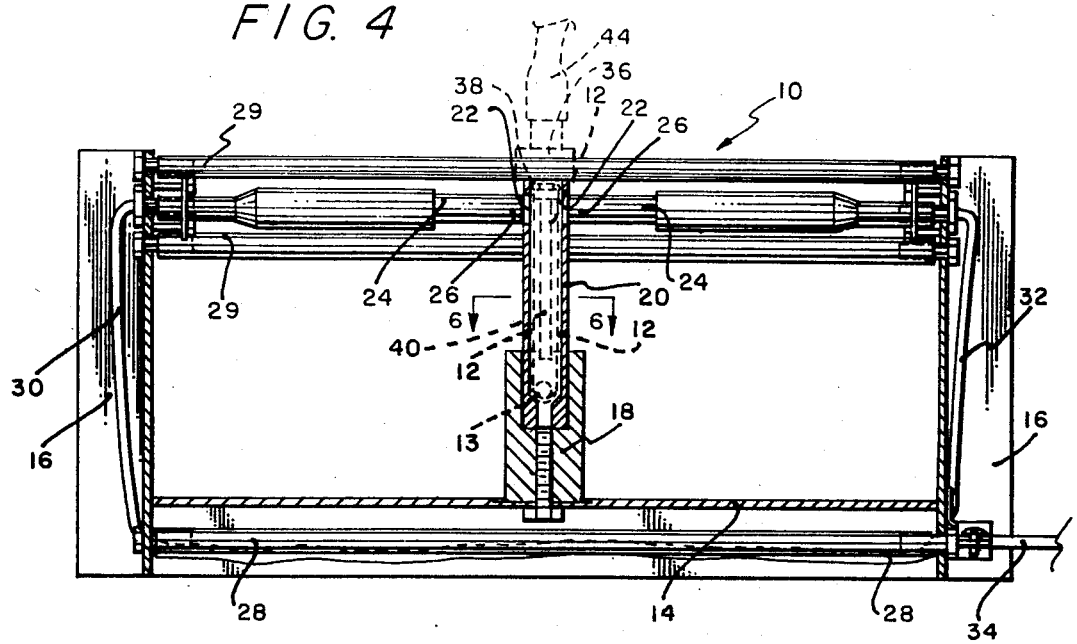
FIG. 4
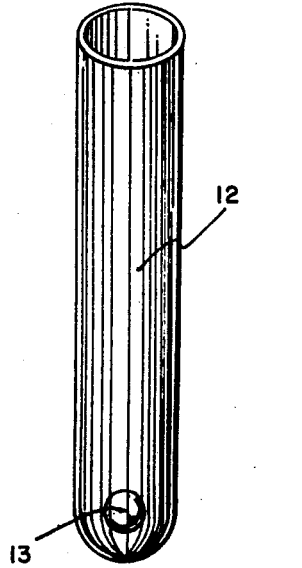
FIG. 7
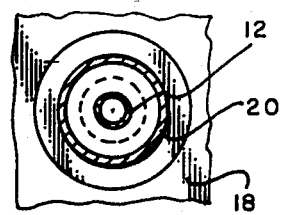
FIG. 6
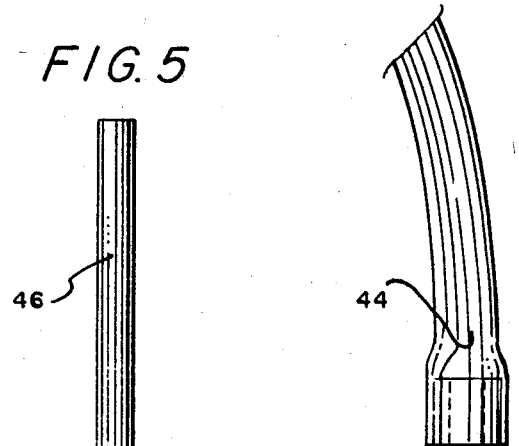
FIG. 5
FIG. 8

METHOD FOR CRIMPING A TUBE

This is a division of application Ser. No. 587,949, filed Mar. 9, 1984, now U.S. Pat. No. 4,515,550.

BACKGROUND OF THE INVENTION

1. Field of the Invention

This invention provides an improved apparatus for crimping a tube. More specifically, this invention contemplates a novel apparatus for forming a tube and a process for crimping a tube to retain an antibody or antigen coated ball or the like, therein for assaying.

2. Description of the Prior Art

U.S. Pat. No. 4,032,281 by Rakovsky discloses an apparatus and method for forming a plastic tube or container. The Rakovsky's disclosure illustrates a means for forming a necked plastic container wherein the area of the container adjacent the open end thereof may be heated and then a vacuum drawn to cause the heated areas to constrict inwardly. U.S. Pat. No. 4,097,570 by Dickson, et al, teaches a plastic tube which is subjected to heating and then physically deformed to cause the configuration as shown in its drawings. U.S. Pat. No. 4,215,087 discloses a tube which is heated and then subjected to pressure to cause the outward bulging of the side walls thereof to provide the configuration as illustrated in its drawings. U.S. Pat. No. 3,998,919 by Urquhart discloses an arrangement wherein a plastic member may be heated and then subjected to mechanical deformation against the tube having a supporting mandrel contained therein. None of the foregoing prior art teach or suggest the particular apparatus and method for crimping a tube to retain an antibody or antigen coated ball, or the like.

SUMMARY OF THE INVENTION

This invention accomplishes its desired objects by providing a novel apparatus for forming a tube comprising a base, a pair of legs secured to the ends of the base, and a holder base attached to the base. A tube holder means for holding the tube is connected to the holder base and is supported thereby. The tube holder has a structure defining a pair of diametrically opposed openings. A pair of soldering irons is oppositely secured with respect to each other in proximity to the top of the pair of legs. Each soldering iron means has a hot end that generally registers with one of the opposed openings such as to be in close proximity to the tube being held by the tube holder means in order to soften the material of the tube in the area contiguous to the openings. A power means is provided for conducting and supplying electrical power to each of the soldering iron means. Vacuum means is connected to the top of the tube to suck or pull inward the tube in the spots being softened from the heat of the paid of soldering irons means. Means for cooling the material of the tube in the spots being softened and simultaneously for ceasing the inward movement of the softened spot is provided on the inside of the tube. This invention additionally accomplishes its desired objects by providing a novel process for crimping a tube to retain an antibody or antigen coated ball, or the like, therein comprising the steps of positioning the tube containing the coated ball, or the like, in a tube holding means having a pair of opposed openings and registering the ends of a pair of soldering irons means with the opposed openings and in close proximity to the top of the tube. The process for crimping additionally comprises heating with the pair of soldering irons means the sides of the tube in the area facing the pair of opposed openings of the tube holding means in order to soften the areas; drawing a vacuum on the tube in order to pull inward the area of the tube being softened from the heat of the pair of soldering irons means; and ceasing the inward movement of the pair of softened spots to crimp the tube.

It is an object of the invention to provide a novel apparatus for crimping a tube which is capable of easily being assembled and disassembled and stored. Still further objects of the invention reside in the provision of a process for crimping a tube to retain an antibody or antigen coated ball, or the like, therein and an apparatus for forming a tube which can be easily transported, provides easy accessibility to the interior, and is relatively inexpensive to manufacture.

These together with the various ancillary objects and features will become apparent as the following description proceeds, are attained by this invention, preferred embodiments being shown in the accompanying drawings, by way of example only, wherein:

BRIEF DESCRIPTION OF THE DRAWINGS

FIG. 4 is a partial longitudinal vertical sectional view of the apparatus for crimping a tube;

FIG. 5 is an exploded front elevational view of the plug slidably positioned on the brass cooling conduit;

FIG. 6 is a horizontal sectional view taken in direction of the arrows and along the plane of line 6—6 in FIG. 4;

FIG. 7 is a perspective view of a tube to be crimped and containing an antibody or antigen coated ball;

FIG. 8 is a partial enlarged front elevational view of the vacuum tube to be connected to the plug;

DETAILED DESCRIPTION OF THE INVENTION

Figure 1:
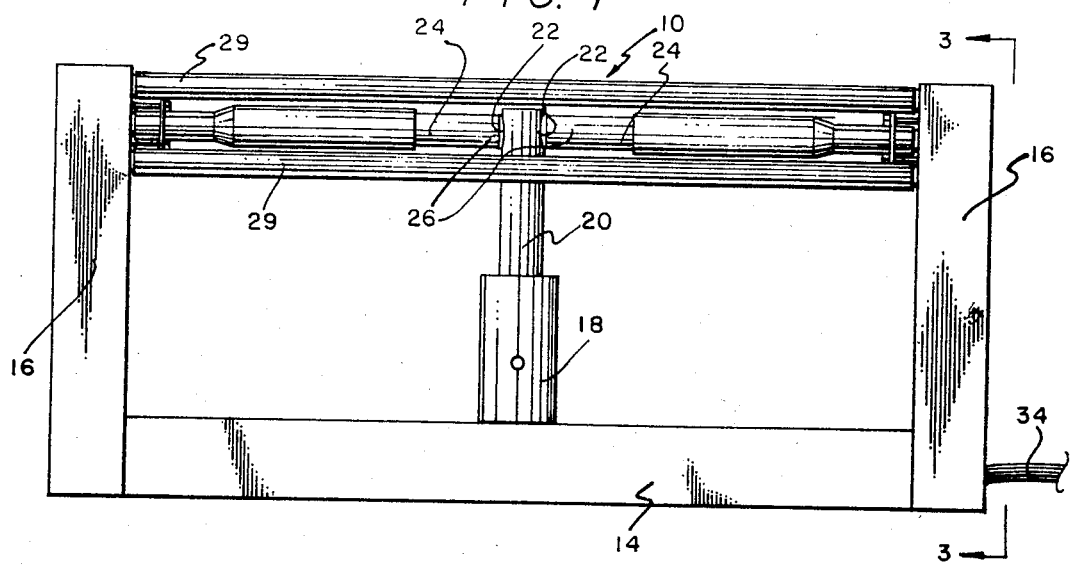
FIG. 1 is a front elevational view of an embodiment of the apparatus for crimping a tube according to the invention.

Referring in detail now to the drawings wherein like reference numerals designate similar parts throughout the various views, there is seen the apparatus generally illustrated as 10, for forming a tube 12, containing an antibody or antigen coated ball 13 comprising a base 14 and a pair of legs 16—16 secured to the ends of the base 14. A holder base 18 is attached to the base 14. A tube holder, generally illustrated as 20, holds the tube 12 and is supported by the holder base 18. The tube holder 20 has a structure defining a pair of diametrically opposed openings 22—22. A pair of soldering irons 24—24 is oppositely secured with respect to each other in proximity to the top of the leg 16—16. Each soldering iron 24 is normal with respect to the leg 16 it is connected to and has a hot end 26 that generally registers (see FIG. 1) with one of the opposed openings 22 such as to be in close proximity to the tube 12 being held by the tube holder 20 in order to soften the material (preferably a clear plastic means) of the tube 12 in the area contiguous to the openings 22—22. A plurality of guard rods 29—29—29—29 connect to the pair of legs 16—16, generally parallel to the base 14 and circumscribe the pair of soldering irons 24—24 to enclose them to protect the user of the apparatus 10 from being burned. At least one clamping rod 28 (see FIG. 4) is implanted in the base 14.

Conductor 30 electrically connects to one of the soldering irons 24 and extends down the contiguous leg 16 and through clamping rod 28 (see FIG. 4). Conductor 32 connects to the opposed soldering iron 24 that conductor 30 connects to and extends down the leg 16 that is opposed to the leg 16 that the conductor 30 extends down. Conductors 30 and 32 connect with a common conductor 34 that is in communication with a power source to conduct electricity to conductors 30 and 32.

A plug 36 with O-ring 38 is slidably positioned on a brass cooling conduit 40 (see FIG. 5). Plug 36 inserts into the top of the tube 12 to air-tightly seal the same from the atmosphere while allowing a structural portion 42 (see FIGS. 5 and 9) of the brass conduit 40 to extend into the tube 12.

Figure 9:
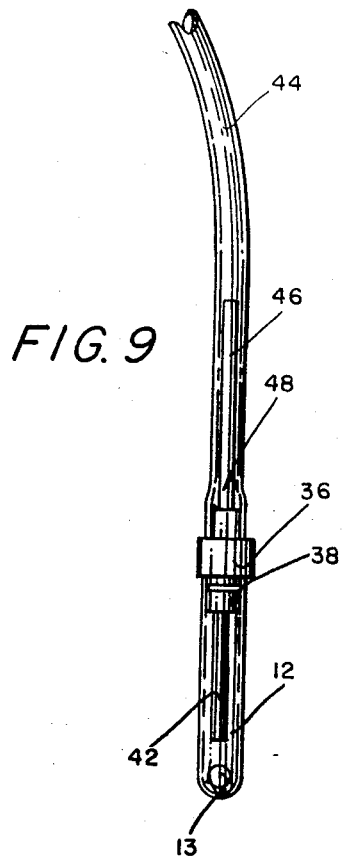
FIG. 9 is a front elevational view of the vacuum tube connected to the plug with the brass conduit slidably positioned on the plug such that part of the brass conduit extends into the tube and another part of the brass conduit extends into the vacuum tube.
Figure 10:
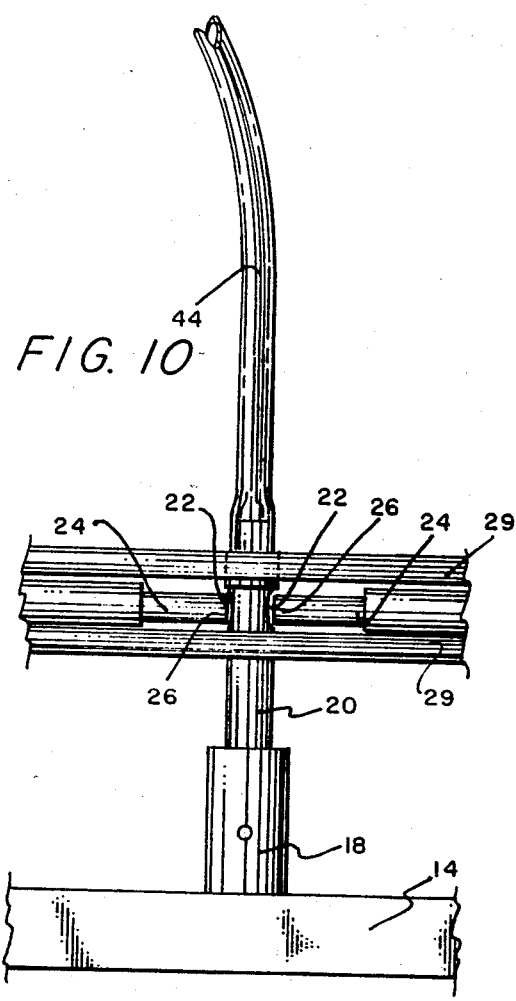
FIG. 10 is a partial front elevational view of the connected combination of FIG. 9 positioned in the tube holder such that a pair of top areas of the tube are in close proximity to the ends of a pair of soldering irons that register with the pair of openings of the tube holder.
Figure 11:
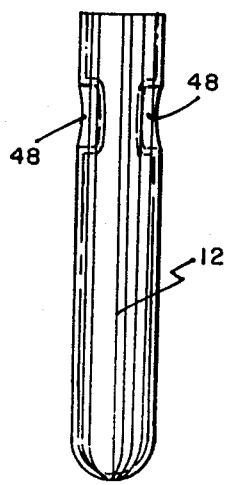
FIG. 11 is a front elevational view of a crimped tube.
Figure 12:
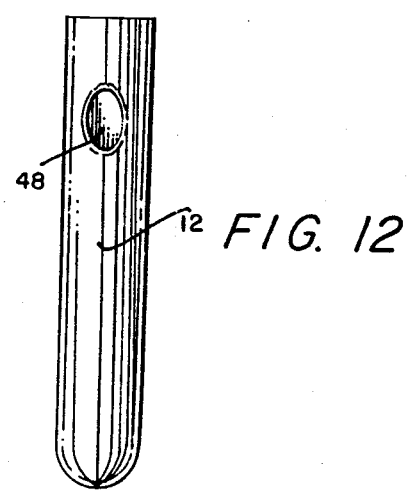
FIG. 12 is a side elevational view of a crimped tube which clearly discloses a sunken-crimped area.

A vacuum tube 44 extends from a vacuum source (not shown in the drawings) to the plug 36 to form an airtight seal therewith as illustrated in FIG. 9. Also shown in FIG. 9 is that structural part 46 of brass conduit 40 preferably extends into the vacuum tube 44 while the end of the vacuum tube 44 is removably sealed around the plug 36. The purpose of the structural portion 42 of the brass conduit 40 is that when a vacuum is drawn on the inside of the tube 12 to suck or pull inward the spots 48—48 (of FIGS. 11 and 12) of the tube 12 that are being softened from heat being applied by the ends 26—26 of the soldering irons 24—24, structural portion 42 ceases the inward movement of the pair of softened spots 48—48 when they come in contact with it and simultaneously starts cooling the spots 48—48.

Figure 2:
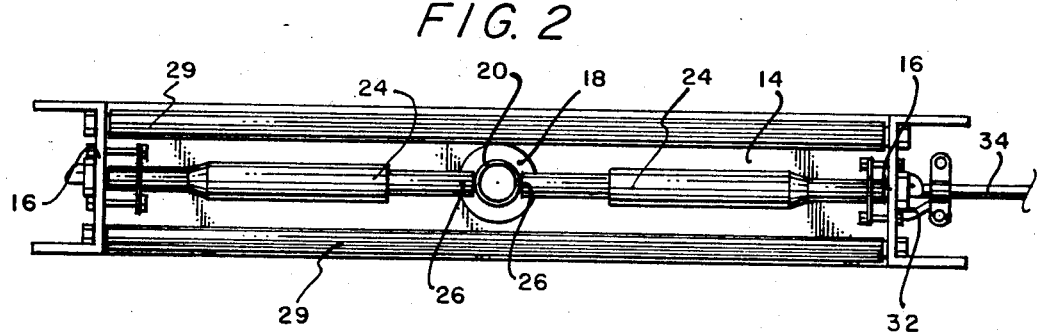
FIG. 2 is a top plan view of the apparatus for crimping a tube.
Figure 3:
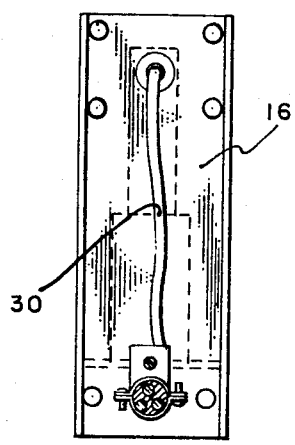
FIG. 3 is a side view taken in direction of the arrows and along the plane of line 3—3 in FIG. 1.

With continuing reference to the drawings for operation of the invention and the process for crimping tube 12 to retain the antibody or antigen coated ball 13, or the like, the tube 12 containing the coated ball 13, or the like, is positioned in the tube holding means 20 which includes openings 22—22. The ends 26—26 of the pair of soldering irons 24—24 are registered in the openings 22—22 and in close proximity to the top of the tube 12 as illustrated in FIGS. 1, 2 and 4. Plug 36 is slidably positioned on brass rod 40 such that structural portion 42 extends below the plug 36 and structural part 46 extends above. Vacuum tube 44 connects from the vacuum source to the plug 36 such that the structural part 46 extends into the vacuum tube 44 as illustrated in FIGS. 4 (see dotted lines) and 9. Plug 36 with the aid of O-ring 38 air tightly seals into the top of the tube 12 as shown in FIG. 9. Plug 36 with the inserted conduit 40 and the connected vacuum tube 44 may be inserted into the top of the tube 12 prior to the placement of tube 12 in the tube holding means 20. The areas 48—48 of the sides of the tube 12 facing the pair of opposed openings 22—22 is heated in order to soften the areas 48—48. The vacuum is turned on in order to draw a vacuum on the inside of tube 12 through the vacuum tube 44 and the brass conduit 40; this vacuum pulls inward the areas 48—48 of the tube 12 being softened from the heat of the pair of soldering irons 24—24. The inward movement of areas 48—48 continues until the areas 48—48 come in contact with the brass conduit 40 whereupon the inward movement ceases and areas 48—48 are fully crimped. Areas 48—48 immediately or simultaneously start cooling upon contact with brass conduit 40 which commences conducting heat away from the softened heated areas 48—48. In another embodiment of the invention, the inward movement of softened heated spots or areas 48—48 may be ceased by terminating the heat from soldering irons 24—24 and the vacuum drawn on the inside of the tube 12 before any contact is made with any brass conduit 40 which would then be unnecessary to the operation of the invention. As soon as the crimped areas 48—48 come in contact with the brass conduit 40, the soldering irons 24—24 should be turned off generally simultaneously therewith. The crimped tube 12 is removed from the tube holder 20 and preferably allowed to further cool for a short period of time before the combined plug 36 and brass conduit 40 is removed.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A process for crimping a tube to retain an antibody or antigen coated ball or the like, therein comprising the steps of;
    (a) positioning the tube containing the coated ball, or the like, in a tube holding means having a pair of opposed openings;
    (b) registering the ends of a pair of soldering iron means with the opposed openings and in close proximity to the top of the tube;
    (c) heating with said pair of soldering iron means the sides of the tube in the area facing the pair of opposed openings of the tube holding means in order to soften the area;
    (d) drawing a vacuum on said tube in order to pull inward the area of the tube being softened from the heat of the pair of soldering iron means; and
    (e) ceasing the inward movement of the pair of softened spots to crimp the tube.

2. The process of claim 1 additionally comprising cooling, simultaneously to said ceasing step (e), the pair of softened spots.

3. The process of claim 2 wherein said ceasing step (e) and cooling step comprises situating prior to drawing step (d) a brass rod in the top of the tube such that when the inward moving softened spots are stopped when they come in contact with the brass rod.

4. The process of claim 1 wherein said ceasing step (e) comprises terminating said heating step (c) and said drawing step (d).

5. The process of claim 1 additionally comprising terminating said heating step (c) generally simultaneous to said ceasing step (e).

* * * * *